(12) United States Patent
Shizuka et al.

(10) Patent No.: US 12,106,090 B2
(45) Date of Patent: Oct. 1, 2024

(54) SOFTWARE UPDATING DEVICE, SOFTWARE UPDATING METHOD, AND SOFTWARE UPDATING PROGRAM THAT PROHIBIT ABNORMALITY WARNING DURING UPDATING PROCESS

(71) Applicant: Nissan Motor Co., Ltd., Yokohama (JP)

(72) Inventors: Yoshimori Shizuka, Kanagawa (JP); Eisuke Ohashi, Kanagawa (JP); Masayuki Motegi, Kanagawa (JP); Hidetoshi Hayashi, Kanagawa (JP); Mitsuhiko Kikuchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 99 days.

(21) Appl. No.: 17/911,667

(22) PCT Filed: Mar. 18, 2020

(86) PCT No.: PCT/IB2020/000334
§ 371 (c)(1),
(2) Date: Sep. 15, 2022

(87) PCT Pub. No.: WO2021/186205
PCT Pub. Date: Sep. 23, 2021

(65) Prior Publication Data
US 2023/0035303 A1     Feb. 2, 2023

(51) Int. Cl.
*G06F 8/65*     (2018.01)
*B60R 16/02*   (2006.01)

(52) U.S. Cl.
CPC ............... *G06F 8/65* (2013.01); *B60R 16/02* (2013.01)

(58) Field of Classification Search
CPC ................. G06F 8/65; B60R 16/02
(Continued)

(56) References Cited

U.S. PATENT DOCUMENTS 6,032,089 A * 2/2000 Buckley ................. B60K 35/00
                                                    701/1
6,643,572 B2 * 11/2003 Kohge ................. B62D 5/0457
                                                   717/168
(Continued)

FOREIGN PATENT DOCUMENTS

JP    2008-195130 A    8/2008
JP    2016-188022 A    11/2016
(Continued)

OTHER PUBLICATIONS

Onuma et al, "Improved Software Updating for Automotive ECUs", ACM, pp. 319-324 (Year: 2016).*

(Continued)

*Primary Examiner* — Anil Khatri
(74) *Attorney, Agent, or Firm* — Global IP Counselors, LLP

(57) ABSTRACT

A software updating device is provided which executes a process for updating software used for operating vehicle-mounted equipment. The software updating device includes a controller that acquires the software and applies the software to the equipment in order to update the software. The controller is configured to: cause a warning device to output a warning when an abnormality relating to the equipment occurs. The controller is further configured to prohibit outputting of the warning by the warning device when the abnormality relating to the equipment is detected while the software update process is being executed.

11 Claims, 2 Drawing Sheets

(58) Field of Classification Search
USPC .................................................. 717/168–174
See application file for complete search history.

(56) References Cited

U.S. PATENT DOCUMENTS

| | | | | |
|---|---|---|---|---|
| 7,103,460 | B1* | 9/2006 | Breed | G07C 5/008 |
| | | | | 706/15 |
| 9,904,531 | B2* | 2/2018 | Suzuki | G06F 8/65 |
| 10,279,757 | B2* | 5/2019 | Netter | B60L 50/15 |
| 10,353,692 | B2* | 7/2019 | Goltz | G06F 8/65 |
| 10,394,548 | B2* | 8/2019 | Fox | G06F 12/0646 |
| 10,423,401 | B2* | 9/2019 | Tschache | G06F 9/44536 |
| 10,573,093 | B2* | 2/2020 | Breed | G07C 5/008 |
| 10,871,959 | B2* | 12/2020 | Nakahara | G06F 8/65 |
| 11,037,177 | B1* | 6/2021 | Chan | G06Q 40/03 |
| 11,176,229 | B2* | 11/2021 | Soryal | H04L 9/3242 |
| 11,347,495 | B2* | 5/2022 | Hayashidera | G06F 8/65 |
| 11,354,114 | B2* | 6/2022 | Ishikawa | G06F 8/66 |
| 12,026,499 | B2* | 7/2024 | Choi | G07C 5/008 |

FOREIGN PATENT DOCUMENTS

| | | |
|---|---|---|
| JP | 2018-20718 A | 2/2018 |
| JP | 2018-97764 A | 6/2018 |
| JP | 2020-27629 A | 2/2020 |

OTHER PUBLICATIONS

Nilsson et al, "Secure Firmware Updates over the Air in Intelligent Vehicles", IEEE, pp. 1-5 (Year: 2008).*

Keleman et al, "Secure firmware update in embedded systems", IEEE, pp. 16-19 (Year: 2019).*

Mahmood et al, "A Model-Based Security Testing Approach for Automotive Over-The-Air Updates", IEEE, pp. 6-13 (Year: 2020).*

Odat et al, "Firmware Over the Air for Automotive, Fotamotive", IEEE, pp. 1-10 (Year: 2014).*

Mbakoyiannis et al, "Secure Over-the-air Firmware Updating for Automotive Electronic Control Units", ACM, pp. 174-181 (Year: 2019).*

* cited by examiner

SOFTWARE UPDATING DEVICE, SOFTWARE UPDATING METHOD, AND SOFTWARE UPDATING PROGRAM THAT PROHIBIT ABNORMALITY WARNING DURING UPDATING PROCESS

CROSS-REFERENCE TO RELATED APPLICATIONS

This application is a U.S. national stage application of International Application No. PCT/IB2020/000334, filed on Mar. 18, 2020.

BACKGROUND

Technical Field

The present invention relates to a software updating device, a software update method, and a software updating program.

Background Information

JP 2018-97764 A discloses an onboard data updating device in which an onboard control unit receives update data from an external server and updates (performs an update process on) a unit that is to be updated by using the aforementioned update data.

SUMMARY

However, when a process for updating software in a vehicle-mounted electronic control unit (ECU) is to be performed, hardware of the ECU is temporarily reset in order to update software rewrite details. Because communications with other onboard equipment are temporarily cut during the reset, an abnormality is assessed to have occurred, a fault code is recorded in a control unit of the vehicle, and a warning is issued to the driver, etc. Therefore, the driver, etc., might be misled into thinking that the software update process has failed or that a fault has occurred in the vehicle, which might cause undue concern on the part of the driver, etc.

The present invention was contrived in view of the above-mentioned problems, it being an object of the present invention to provide a software updating device, a software update method, and a software updating program in which outputting of unnecessary warnings arising from a software update process is prevented.

According to one aspect of the present invention, there is provided a software updating device that executes a process for updating software by which vehicle-mounted equipment is operated. The software updating device is provided with a controller that acquires software and applies the aforementioned software to the equipment, thereby controlling the equipment. The controller: acquires updating software and applies the aforementioned software to the equipment, thereby executing a software update process; and causes a warning device to output a warning when an abnormality relating to the equipment occurs. The controller also prohibits outputting of the warning by the warning device while the software update process is being executed.

BRIEF DESCRIPTION OF THE DRAWINGS

Referring now to the attached drawings which form a part of this original disclosure.

DETAILED DESCRIPTION OF EMBODIMENTS

An embodiment of the present invention is described below with reference to the accompanying drawings, etc.

Figure 1:
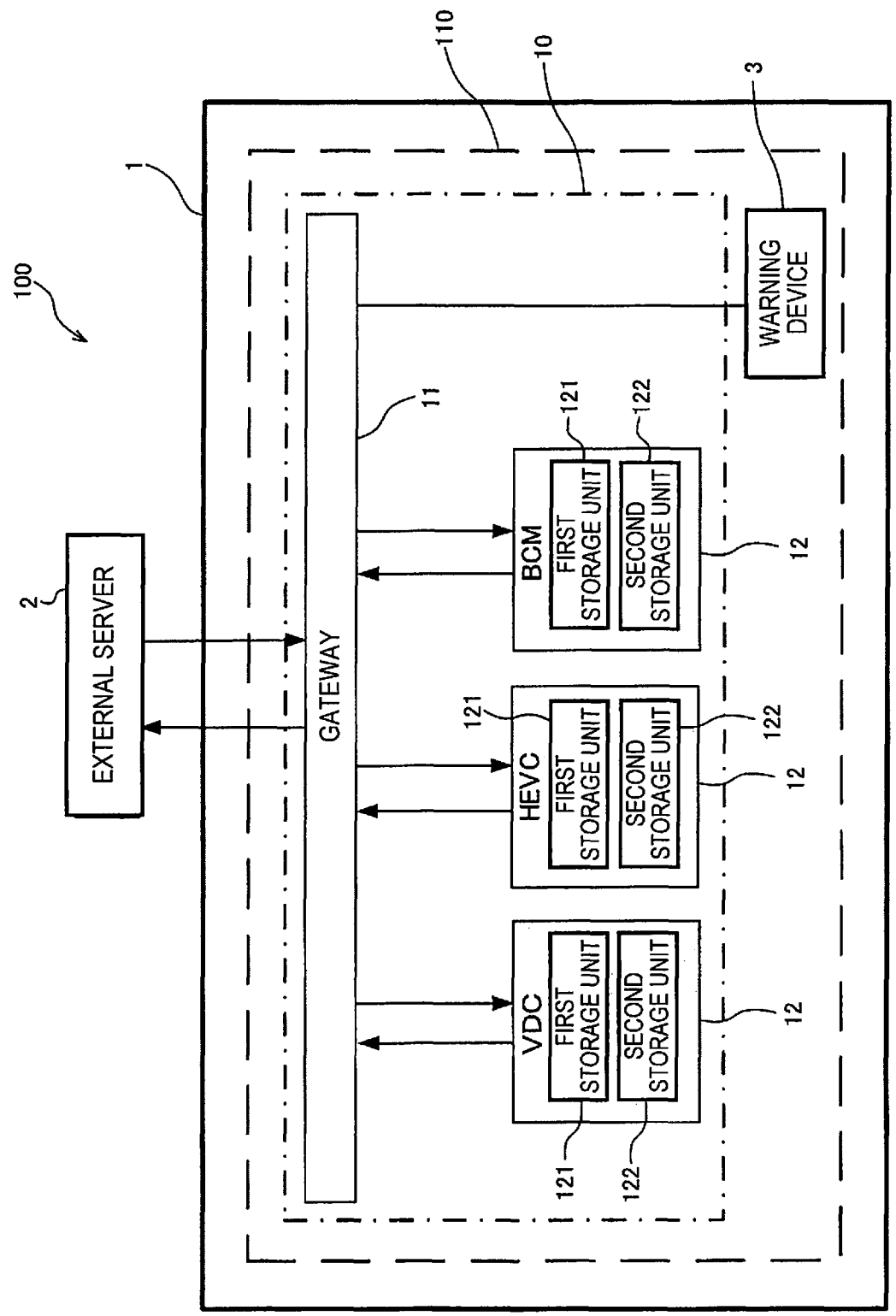
FIG. 1 is a schematic block diagram of a software update system according to one embodiment of the present invention.

One embodiment of the present invention is described with reference to FIGS. 1 and 2. FIG. 1 is a schematic block diagram of a software update system 100 and a software updating device 110 according to this embodiment of the present invention.

As shown in FIG. 1, the software update system 100 is configured from a software updating device 110 mounted in a vehicle 1, and an external server 2. The software updating device 110 is configured from a controller 10 and a warning device 3. The vehicle 1 is, e.g., an electric vehicle (EV).

The controller 10 includes a gateway 11 that acquires software from the external server 2, and electronic control units 12 that control various pieces of equipment mounted in the vehicle 1.

The gateway 11 is capable of communicating with the external server 2 and the electronic control units 12. The gateway 11 acquires updating software from the external server 2 and transmits the aforementioned acquired updating software to electronic control units 12 that are to be updated. Additionally, the gateway 11 is also capable of communicating with the warning device 3, which shall be described later. The gateway 11 acquires control information for the various pieces of equipment from the electronic control units 12 and senses the occurrence of an abnormality relating to the various pieces of equipment from the aforementioned control information. The gateway 11 has a storage region for recording a fault code when an abnormality occurs. Upon sensing the occurrence of an abnormality in the various pieces of equipment, the gateway 11 records a fault code corresponding to the aforementioned abnormality in the storage region. When the fault code is recorded in the storage region, the gateway 11 outputs a warning by using the warning device 3 on the basis of the recorded fault code.

The gateway 11 is configured from a computer provided with a central processing device (CPU), a read-only memory (ROM), a random access memory (RAM), and an input/output interface (I/O interface), the gateway 11 integrally controlling the software updating device 110. By executing a specific program, the gateway 11 executes a process for controlling the software updating device 110. Together with, e.g., the electronic control units 12, the gateway 11 performs software update control that shall be described later.

The electronic control units (ECUs) 12 are controllers that control the various pieces of equipment mounted in the vehicle 1, and include, e.g., a body control module (BCM), a vehicle dynamics control (VDC), and a hybrid electric vehicle control (HEVC). The various ECUs 12 are each configured from a computer provided with a central processing device (CPU), a read-only memory (ROM), a random access memory (RAM), and an input/output interface (I/O interface). The BCM controls operating elements in a body of the vehicle 1, including an engine starter, a door lock, etc., of the vehicle 1. The VDC controls output of brakes or an engine of the vehicle 1 and controls an orientation of the vehicle 1, thereby preventing, inter alia, lateral sliding of the vehicle 1. When the vehicle 1 is a hybrid vehicle, the HEVC controls the engine and a motor, which are drive sources, and realizes high-efficiency driving.

The ECUs 12 are capable of communicating with the gateway 11 and continuously transmit control information for the various pieces of equipment to the gateway 11 in the form of signals. The various ECUs 12 acquire software including the specific program from the gateway 11 and apply the acquired software to the equipment being controlled, thereby controlling the equipment. The ECUs 12 also perform, together with the gateway 11, the software update control that shall be described later.

The various ECUs 12 are also each provided with two storage units 121, 122 that store the software acquired from the gateway 11. The ECUs 12 apply the software stored in one storage unit (first storage unit) 121 to the equipment, and change the software being applied to the equipment to the software stored in the other storage unit (second storage unit) 122, thereby updating the software. Further details about a software update process shall be described later.

The warning device 3 is, e.g., a warning lamp in the vehicle 1. When an abnormality occurs in the various pieces of equipment mounted in the vehicle 1, the warning device 3 informs the driver, etc., about the aforementioned abnormality. The warning device 3 is capable of communicating with the gateway 11. Upon sensing the occurrence of an abnormality in onboard equipment, the gateway 11 records a fault code corresponding to the aforementioned abnormality in the storage region and, for example, causes the warning lamp, which is the warning device 3, to illuminate, thereby outputting a warning. The warning device 3 is not limited to being a warning lamp, and can be, e.g., an alarm that operates through sound.

The software update process is described next.

As described previously, the various ECUs 12 are each provided with two storage units 121, 122. When the ECUs 12 acquire software (first software) that is transmitted from the gateway 11, the aforementioned software is stored in one storage unit (first storage unit) 121, and the ECUs 12 apply the aforementioned software to the equipment. The first software can also be already stored in the first storage unit 121 in an initial state rather than being acquired from the gateway 11.

When the ECUs 12 then acquire updating software (second software) that is transmitted from the gateway 11, the aforementioned updating software is stored in the other storage unit (second storage unit) 122. The first software is still applied to the equipment while the ECUs 12 are acquiring and storing the second software.

Thus, providing two storage units 121, 122 to each of the various ECUs 12 makes it possible for the ECUs 12 to acquire (download) and store (install) the updating software in a state in which the first software is applied to the equipment. Specifically, it is possible to acquire and store the updating software without stopping operation of the equipment being controlled.

Upon acquiring and storing the updating software (second software), the ECUs 12 change the software applied to the equipment from the first software to the second software. The software applied to the equipment is thereby updated. The process for changing the software applied to the equipment from the first software to the second software is referred to below as a software update process (activation).

When the process for updating the software in the ECUs 12 is to be performed, hardware in the ECUs 12 is temporarily reset in order to update software rewrite details. Because communications between the ECUs 12 that are to be updated and ECUs 12 that control other onboard equipment are temporarily cut during the reset, an abnormality in the equipment is assessed to have occurred, and a fault code is recorded in the storage region of the gateway 11. A warning is therefore issued to the driver, etc., by the warning device 3. Therefore, the driver, etc., might be misled into thinking that the software update process has failed or that a fault has occurred in the vehicle 1, which might cause undue concern on the part of the driver, etc. Additionally, because software update processes of the various ECUs 12 are not limited to being executed simultaneously, it is also possible that a plurality of warnings will be issued one after another. There is a risk that such issuance of a plurality of warnings might cause more undue concern on the part of the driver, etc. Thus, in the present embodiment, outputting of warnings by the warning device 3 while the software update process is being executed is prohibited.

Specifically, while the software update process is being executed, the gateway 11 does not record a fault code in the storage region even if the occurrence of an abnormality relating to the equipment is sensed. This makes it possible for outputting of warnings while the software update process is being executed to be prohibited.

Thus, because outputting of warnings by the warning device 3 while the software update process is being executed is prohibited, it is possible to prevent outputting of unnecessary warnings arising from the software update process.

In a case in which the occurrence of an equipment abnormality not arising from the software update process is sensed after outputting of warnings is prohibited, a fault code will be recorded and a warning will be outputted after conclusion of the update process, provided that the aforementioned abnormality is not eliminated even after the software update process has concluded.

Figure 2:
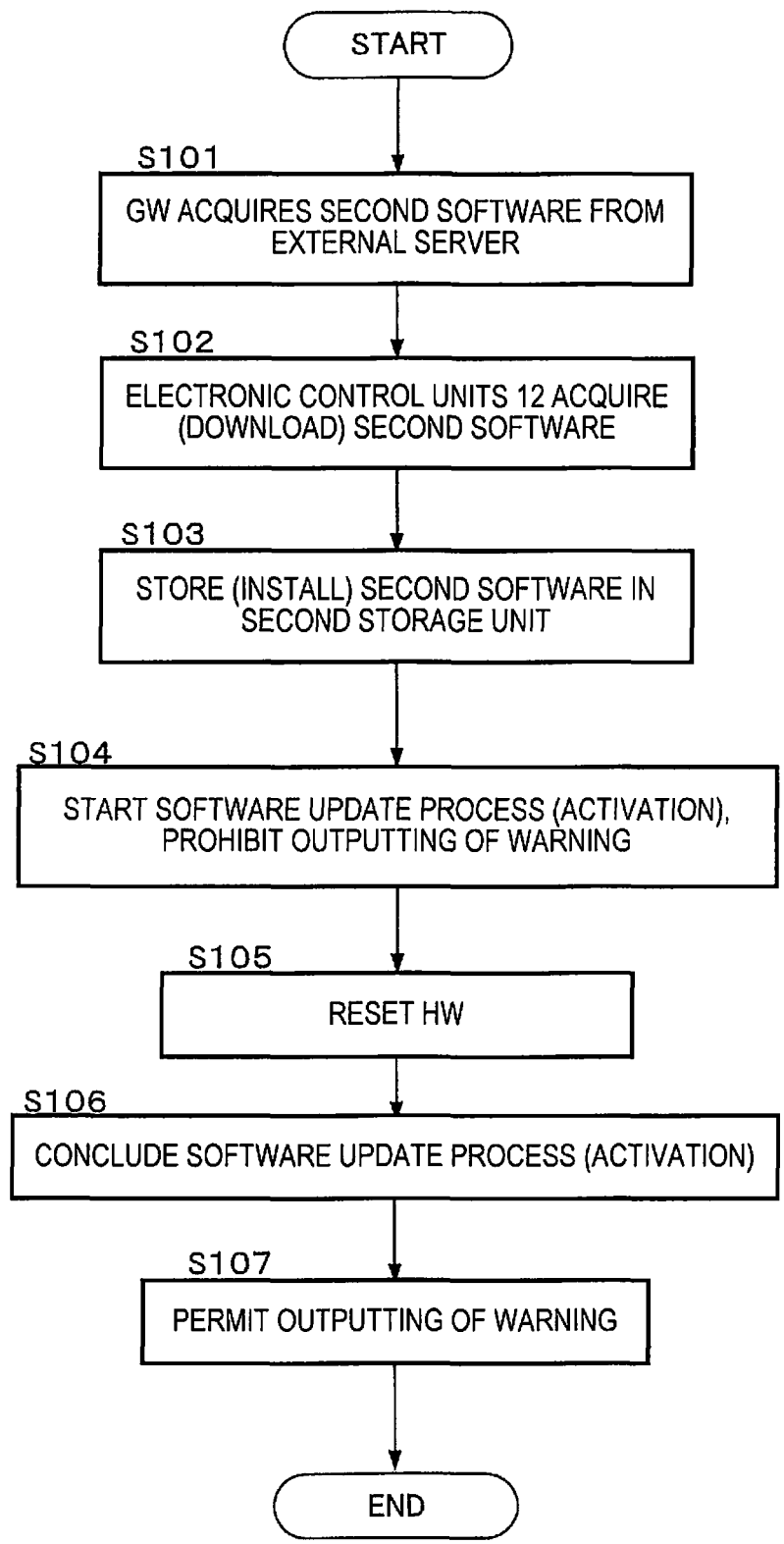
FIG. 2 is a flowchart illustrating software update control according to the one embodiment of the present invention.

FIG. 2 is a flowchart illustrating software update control according to the one embodiment of the present invention. The control described below is, in either instance, executed by the controller 10 (gateway 11 and ECUs 12). The first software is stored in the first storage units 121 of the ECUs 12 in an initial state, and is applied to the equipment being controlled.

In step S101, upon acquiring the updating software (second software) from the external server 2, the gateway (GW) 11 transmits the aforementioned updating software to the ECUs 12 that are to be updated.

In step S102, the ECUs 12 acquire (download) the updating software (second software) from the gateway 11.

Next, in step S103, the ECUs 12 store (install) the updating software (second software) in the second storage unit 122. Because the first software is still applied to the equipment being controlled by the ECUs 12 while the second software is being acquired and stored in steps S102 and S103, the equipment being controlled by the ECUs 12 is not stopped. Therefore, for example, the updating software can be acquired and stored even while the vehicle 1 is traveling. Additionally, because the updating software can be activated within a short time, it is possible to perform processes for acquiring, storing, and updating the software in a state in which an ignition switch is turned on (including while the vehicle 1 is traveling).

In step S104, the gateway 11 prohibits outputting of warnings by the warning device 3 simultaneously with starting of the software update process by the ECUs 12.

The ECUs 12 change the software applied to the equipment being controlled from the first software to the second software, whereby the software update process is executed. The software applied to the equipment is thereby updated from the first software to the second software. During the software update process, it is preferable for the driver to be notified via a display device, etc. (not shown), that the update process is in progress.

Outputting of warnings is prohibited by, e.g., masking the storage region of the gateway 11. As a consequence, fault codes are not recorded in the storage region even if the gateway 11 senses the occurrence of an abnormality relating to the equipment. Therefore, outputting of warnings by the warning device 3 is prohibited.

Step S104 can be configured such that the update process is permitted only when no occurrence of abnormality is sensed before the software update process is started. For example, the gateway 11 senses whether an abnormality has occurred in the equipment controlled by the pre-software-update ECUs 12 and transmits results of the aforementioned sensing to the ECUs 12. The ECUs 12 execute the update process only when no occurrence of abnormality has been sensed. In a case in which the occurrence of an abnormality in the equipment is sensed before the software update process is executed, the ECUs 12 prohibit the software update process until the aforementioned abnormality is eliminated. Specifically, because outputting of warnings while the software update process is being executed is prohibited, no warning is outputted even with respect to an abnormality not arising from the update process. Therefore, eliminating an abnormality not arising from the software update process before starting the software update process reliably prevents a countermeasure to the abnormality from being delayed until after the software update process. The software update process can be permitted or prohibited by the gateway 11.

Once the software update process is started in step S104, the gateway 11, in step S105, temporarily resets the hardware (HW) of the ECUs 12 that are to be updated and updates the software rewrite details. Once the HW of the ECUs 12 is reset, communications between the ECUs 12 that are to be updated and the ECUs 12 that control other onboard equipment are temporarily cut. The gateway 11 senses the severance of communication as the occurrence of an abnormality relating to the equipment, but because the storage region of the gateway 11 is masked, no fault code is recorded in the storage region. Therefore, no warning is outputted.

Next, once the software update process has concluded in step S106, the gateway 11, in step S107, removes the prohibition on outputting of warnings (permits outputting of warnings) and terminates the software update process.

Thus, because outputting of warnings by the warning device 3 while the software update process is being executed is prohibited, it is possible to prevent outputting of unnecessary warnings arising from the software update process.

Additionally, in a case in which the occurrence of an equipment abnormality not arising from the software update process is sensed by the gateway 11 over the course of steps S104 to S107 after outputting of warnings is prohibited, a warning will be outputted after the prohibition on outputting of warnings is removed, provided that the aforementioned abnormality is not eliminated even after the software update process has concluded.

The prohibition on outputting of warnings is preferably removed immediately after conclusion of the software update process, but such an arrangement is not necessarily provided by way of limitation. For example, outputting of warnings can be permitted after a fixed time has elapsed.

After the software update process has concluded, when the software is furthermore updated in a subsequent instance, updating software that is transmitted from the gateway 11 to the ECUs 12 is stored (written over) in the first storage unit 121. The software applied to the equipment is changed from the second software stored in the second storage unit 122 to the aforementioned updating software that is stored in the first storage unit 121, whereby the software is re-updated.

The processes shown in FIG. 2 are configured as programs that are to be executed by the controller 10, which is a computer. These programs are written in a storage medium.

By using the software updating device 110 according to the embodiment described above, it is possible to obtain the following effects.

In the software updating device 110, the gateway 11 (controller 10) causes the warning device 3 to output a warning when an abnormality relating to the equipment occurs, and prohibits outputting of warnings by the warning device 3 while the software update process is being executed. Because outputting of warnings while the software update process is being executed is prohibited, no warning is outputted even if the HW of the ECUs 12 is temporarily reset and communication with other electronic control units is temporarily severed in order to update the software rewrite details. Therefore, it is possible to prevent outputting of unnecessary warnings arising from the software update process.

In the software updating device 110, the gateway 11 (controller 10) prohibits outputting of warnings while the software update process is being executed, and permits outputting of warnings after the software update process has concluded. This makes it possible to prevent outputting of unnecessary warnings arising from the software update process and to warn the driver, etc., about an equipment abnormality not arising from the software update process, the warning being issued after the software update process.

In the software updating device 110, when an abnormality relating to the equipment occurs, the gateway 11 (controller 10) records a fault code corresponding to the aforementioned abnormality in a storage region of the gateway 11 (controller 10), and causes the warning device 3 to output a warning on the basis of the recorded fault code. However, the gateway 11 (controller 10) does not record a fault code while the software update process is being executed even if an abnormality relating to the equipment occurs. Therefore, no warning is outputted by the warning device 3 while the software update process is being executed. It is therefore possible to prevent outputting of unnecessary warnings arising from the software update process.

In the software updating device 110, each of the ECUs 12 (controller 10) has the first storage unit 121 that stores the first software and the second storage unit 122 that stores the second software. Therefore, it is possible to acquire the updating software (second software) and to store the updating software in the second storage unit 122 in a state in which the first software stored in the first storage unit 121 is applied to the equipment. It is therefore possible to acquire and store the updating software without stopping the equipment controlled by the ECUs 12 that are to be updated, and convenience during software update work is improved.

The software updating device 110 is provided with a plurality of ECUs 12 that control each of a plurality of equipment, and each of the plurality of ECUs 12 executes the software update process. The gateway 11 (controller 10) prohibits outputting of warnings by the warning device 3 while the software update processes are being executed. Thus, prohibiting outputting of warnings while the software update processes of the various ECUs 12 are being executed makes it possible to prevent a plurality of warnings arising from the software update processes of the various ECUs 12 from being issued one after another and causing more undue concern on the part of the driver, etc.

In the present embodiment, a BCM, a VDC, and an HEVC are employed as the ECUs 12, but the types of ECUs 12 and the quantity thereof are not limited to those in the present embodiment, provided that the ECUs 12 control equipment mounted in the vehicle 1.

The software update control including the software update process according to the present embodiment can be executed simultaneously in any number of the plurality of ECUs 12, or can be executed at different times for each of the various ECUs 12.

In the present embodiment, a configuration was employed in which the gateway 11 integrally controls the software updating device 110 and the ECUs 12 control the various pieces of equipment mounted in the vehicle 1. However, the elements executing the various controls can be either of the gateway 11 and the ECUs 12. For example, the changing of the software applied to the equipment (i.e., the software update process) can be executed by the gateway 11 rather than by the ECUs 12.

In the present embodiment, when an abnormality relating to the equipment occurs, a fault code corresponding to the aforementioned abnormality is recorded in the storage region of the gateway 11, and a warning is outputted by the warning device 3 on the basis of the recorded fault code. However, the method for outputting a warning is not limited to this arrangement. For example, when the occurrence of an abnormality in the equipment is sensed, the warning device 3 can be directly caused to output a warning, without a fault code having been recorded.

In the present embodiment, even if an abnormality relating to the equipment is sensed, the storage region of the gateway 11 is masked and no fault code is recorded while the software update process is being executed, whereby outputting of warnings while the update process is being executed is prohibited. However, the method for prohibiting warnings is not necessarily limited to this arrangement. For example, when the occurrence of an abnormality in the equipment is sensed as described above, in a case in which the warning device 3 is directly caused to output a warning without a fault code having been recorded, the prohibition on outputting of warnings also involves directly prohibiting the warning device 3 from outputting warnings.

In the present embodiment, the ECUs 12 are each configured so as to have two storage units 121, 122. However, such an arrangement is not necessarily provided by way of limitation. As described previously, it is preferable for each of the ECUs 12 to have two storage units 121, 122 in order to make it possible to acquire and store the updating software without stopping the onboard equipment, but the ECUs 12 can also each be configured so as to have only one storage unit. When each of the ECUs 12 has only one storage unit, the updating software is written over the software stored in the aforementioned storage unit, whereby the software update process is performed. Outputting of warnings is also prohibited while the updating software is being acquired and stored when each of the ECUs 12 has only one storage unit.

An embodiment of the present invention has been described above, but this embodiment merely indicates one example in which the present invention is applied, and is in no way intended to restrict the technical scope of the present invention to the specific configuration of the embodiment.

The invention claimed is:

1. A software updating device comprising:
a controller including a processor and a storage; and
a warning device including at least one of a lamp or an alarm sound emitter,
the controller being configured to:
acquire a second software to be used for updating a first software that operates a vehicle-mounted equipment of a vehicle;
execute an update process that includes overwriting the first software with the second software;
determine whether an abnormality has occurred in the vehicle-mounted equipment;
upon determining that the abnormality has occurred at a time other than while the update process is being executed,
record a fault code corresponding to the abnormality in the storage and cause the warning device to output a warning based on the fault code; and
upon determining that the abnormality has occurred while the update process is being executed, prohibit outputting of the warning by the warning device without recording the fault code.

2. The software updating device according to claim 1, wherein
the controller is configured to permit the outputting of the warning by the warning device after the update process has concluded.

3. The software updating device according to claim 1, wherein
the controller is configured to permit the executing of the update process when no abnormality relating to the vehicle-mounted equipment has occurred before the executing of the update process.

4. The software updating device according to claim 1, wherein:
the controller includes
a first storage unit that stores the first software, and
a second storage unit that stores the second software; and
the controller is configured to
change the software applied to the vehicle-mounted equipment by overwriting the first software with the second software, thereby executing the update process, and
prohibit the outputting of the warning by the warning device while the update process is being executed.

5. The software updating device according to claim 1, wherein
the vehicle-mounted equipment includes a plurality of equipment,
the software updating device executes a plurality of software updating processes for updating software that operate the plurality of equipment;
the controller includes a plurality of electronic control units that control each of the plurality of equipment;
each of the plurality of electronic control units acquires the updating software and applies the software to each of the plurality of equipment, thereby executing the update process; and
the controller is configured to prohibit outputting of the warning by the warning device while the update process is being executed.

6. The software updating device according to claim 5, wherein:
- the controller further includes a gateway that acquires the plurality of software updating processes from an external source and that transmits the plurality of software updating processes to the plurality of electronic control units;
- each of the plurality of electronic control units is configured to acquire the updating software from the gateway and apply the software to the equipment, thereby executing the update process; and
- the gateway senses an occurrence of the abnormality relating to the vehicle-mounted equipment.

7. The software updating device according to claim 6, wherein
- the gateway is configured to sense the occurrence of the abnormality relating to the vehicle-mounted equipment before the update process is executed, and transmit results of the sensing to the electronic control units.

8. The software updating device according to claim 7, wherein:
- each of the electronic control units includes
- a first storage unit that stores the first software, and
- a second storage unit that stores the second software,
- the electronic control units are configured to change the software applied to the equipment by overwriting the first software with the second software, thereby executing the update process; and
- the gateway is configured to prohibit the outputting of the warning by the warning device while the update process is being executed.

9. The software updating device according to claim 1, wherein:
- the warning device is a warning lamp in the vehicle; and
- the controller is configured to cause the warning lamp to illuminate, thereby causing the warning device to output the warning.

10. A method for updating software comprising:
- acquiring a second software to be used for updating a first software that operates a vehicle-mounted equipment of a vehicle;
- executing an update process that includes overwriting the first software with the second software;
- determining whether an abnormality has occurred in the vehicle-mounted equipment; upon determining that the abnormality has occurred at a time other than while the update process is being executed,
- recording a fault code corresponding to the abnormality in a storage and causing a warning device to output a warning based on the fault code; and
- upon determining that the abnormality has occurred while the update process is being executed, prohibiting the outputting of the warning by the warning device without recording the fault code.

11. A computer-readable medium comprising:
- a non-transitory tangible medium on which is stored a computer-executable software updating program for implementing an update process for updating first software that operates a vehicle-mounted equipment,
- the software updating program being configured to cause a controller to:
- acquire second software to be used for updating the first software;
- execute the update process by overwriting the first software with the second software;
- determine whether an abnormality has occurred in the vehicle-mounted equipment;
- upon determining that the abnormality has occurred at a time other than while the update process is being executed,
- record a fault code corresponding to the abnormality in a storage and cause a warning device to output a warning based on the fault code; and
- upon determining that the abnormality has occurred while the update process is being executed, prohibit the outputting of the warning by the warning device without recording the fault code.

* * * * *